United States Patent
Sicard et al.

(10) Patent No.: US 12,047,104 B2
(45) Date of Patent: Jul. 23, 2024

(54) COMMUNICATIONS SYSTEM

(71) Applicant: NXP USA, INC., Austin, TX (US)

(72) Inventors: Thierry Michel Alain Sicard, Auzeville tolosane (FR); Guerric Panis, Cambernard (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/478,095

(22) Filed: Sep. 29, 2023

(65) Prior Publication Data
US 2024/0039571 A1  Feb. 1, 2024

Related U.S. Application Data

(62) Division of application No. 17/646,926, filed on Jan. 4, 2022, now Pat. No. 11,811,443.

(30) Foreign Application Priority Data

Jan. 8, 2021 (EP) .................................... 21305018

(51) Int. Cl.
*H04B 1/02* (2006.01)
*H04B 1/10* (2006.01)
*H04B 1/18* (2006.01)

(52) U.S. Cl.
CPC ............. *H04B 1/18* (2013.01); *H04B 1/1009* (2013.01)

(58) Field of Classification Search
CPC ... H04B 1/04; H04B 1/18; H04B 1/40; H04B 1/009; H04B 1/581; H04B 3/03; H01F 5/00; H01F 5/04
See application file for complete search history.

(56) References Cited

U.S. PATENT DOCUMENTS

| | | |
|---|---|---|
| 4,944,299 A | 7/1990 | Silvian |
| 6,408,032 B1 | 6/2002 | Lye et al. |
| 6,711,385 B1 | 3/2004 | Abraham |
| 7,005,943 B2 | 2/2006 | Cern |
| 7,577,205 B1 * | 8/2009 | Liu .......................... H04B 3/30 375/258 |
| 7,911,244 B2 * | 3/2011 | Kikuchi .............. H04L 25/0276 327/563 |
| 2002/0137482 A1 * | 9/2002 | Takeyabu ............ H04L 27/2626 455/127.1 |
| 2009/0243683 A1 | 10/2009 | Ochi et al. |

* cited by examiner

*Primary Examiner* — Tuan Pham

(57) ABSTRACT

The disclosure relates to a communications system having a transmitter and receiver connected via a transmission line. An example communications receiver (202) comprises: a pair of input connections (211, 212) for connecting to a transmission line (203); a termination resistance (213) equal to a characteristic impedance (Zc) of the transmission line (203); an air core transformer (205) having an input coil (206) connected to the pair of input connections (211, 212) via the termination resistance (213); and a comparator circuit (208) connected to an output coil (207) of the air core transformer (205), the comparator circuit (208) configured to provide an output signal (504) responsive to detection of voltage pulses across the output coil (207).

11 Claims, 4 Drawing Sheets

COMMUNICATIONS SYSTEM

CROSS-REFERENCE TO RELATED APPLICATIONS

This application claims the priority under 35 U.S.C. § 119 of European Patent application no. 21305018.0, filed on 8 Jan. 2021, the contents of which are incorporated by reference herein.

This application is a divisional application of a U.S. patent application entitled "COMMUNICATIONS SYSTEM", having a Ser. No. 17/646,926, having a filing date of Jan. 4, 2022, having common inventors, and having a common assignee, all of which is incorporated by reference in its entirety.

FIELD

The disclosure relates to a wired communications system having a transmitter and a receiver connected via a transmission line.

BACKGROUND

Wired communication interfaces may be galvanically isolated to ensure that voltage levels at a receiver and transmitter side of a transmission line are isolated from each other. Galvanic isolation may commonly be achieved by use of a ferrite transformer, which allows transmission of the full bandwidth of an input signal. An example communications system 100 is illustrated in FIG. 1. The system 100 comprises a transmitter side 101 and receiver side 102, connected via a transmission line 103. The transmitter and receiver sides 101, 102 both comprise a ferrite transformer 104, 105 connected across the transmission line 103, which may be a differential line comprising a twisted pair of wires.

Also shown in FIG. 1 is an example set of signals relating to the communications system 100. A transmission signal TX is provided at the input side of the transmitter transformer 104 in the form of a square wave pulse, which results in a signal 107 transmitted along the transmission line and a received signal RX at the output side of the receiver transformer 105. The transmitted and received signals TX, RX are similar in form, with a delay 108 corresponding to a length of the transmission line 103.

Each transformer 104, 105 in the system 100 adds a parasitic capacitance 106a-d across each pair of input and output terminals. In a typical application, each transformer 104, 105 may have an inductance of around 150 µH and may contribute a parasitic capacitance of around 80 pF between the primary and secondary coils. This relatively high capacitance has a low impedance at high frequencies, which can result in a high current when subjected to a bulk current injection (BCI) test unless a common mode choke is added. The common mode of the receiver may reach up to +/−40V, which may require the receiver to have high ESD protection, requiring additional silicon area. These factors all add to the bulk and cost of the overall system.

SUMMARY

In accordance with a first aspect there is provided a communications receiver comprising:
  a pair of input connections for connecting to a transmission line;
  a termination resistance equal to a characteristic impedance of the transmission line;
  an air core transformer having an input coil connected to the pair of input connections via the termination resistance; and
  a comparator circuit connected to an output coil of the air core transformer, the comparator circuit configured to provide an output signal responsive to detection of voltage pulses across the output coil.

The termination resistance may be alternatively or additionally defined to be greater than, and optionally greater than twice that of, the impedance of the input coil at a frequency of operation of the communications receiver.

The comparator circuit may be configured to switch the output signal between a first level and a second level upon reception of a voltage pulse across the output coil.

The comparator circuit may be configured to switch the output signal from a first voltage level to a second voltage level upon reception of a positive voltage pulse across the output coil and to switch the output signal from the second voltage level to the first voltage level upon reception of a negative voltage pulse across the output coil.

The air core transformer may have a coil ratio of n:1, where n is the number of turns of the input coil.

In accordance with a second aspect there is provided a communications transmitter comprising:
  a pair of output connections for connecting to a transmission line;
  a termination resistance equal to a characteristic impedance of the transmission line;
  an air core transformer having an output coil connected to the pair of output connections via the termination resistance; and
  a driver circuit connected to an input coil of the air core transformer, the driver circuit configured to drive a current through the input coil to provide a voltage pulse across the input coil in response to a change of state of an input signal provided to an input of the driver circuit.

The termination resistance may be alternatively or additionally defined to be greater than, and optionally greater than twice that of, the impedance of the output coil at a frequency of operation of the communications transmitter.

The driver circuit may be configured to provide the voltage pulse having a quadratic shaped rising edge.

The air core transformer may have a coil ratio of n:1, where n is the number of turns of the output coil.

In the communications receiver or the communications transmitter, n may be between around 1 and around 5, and optionally between around 2 and 3.

The air core transformer or the communications receiver or transmitter may be formed from parallel wire loops within a PCB. A parasitic capacitance of the air core transformer may be less than 0.5 pF. Each turn of the input or output coil may have an inductance of less than 50 nH.

In accordance with a third aspect there is provided a communications system comprising:
  a communications transmitter according to the first aspect;
  a communications receiver according to the second aspect; and
  a transmission line connected between the output connections of the transmitter and the input connections of the receiver.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
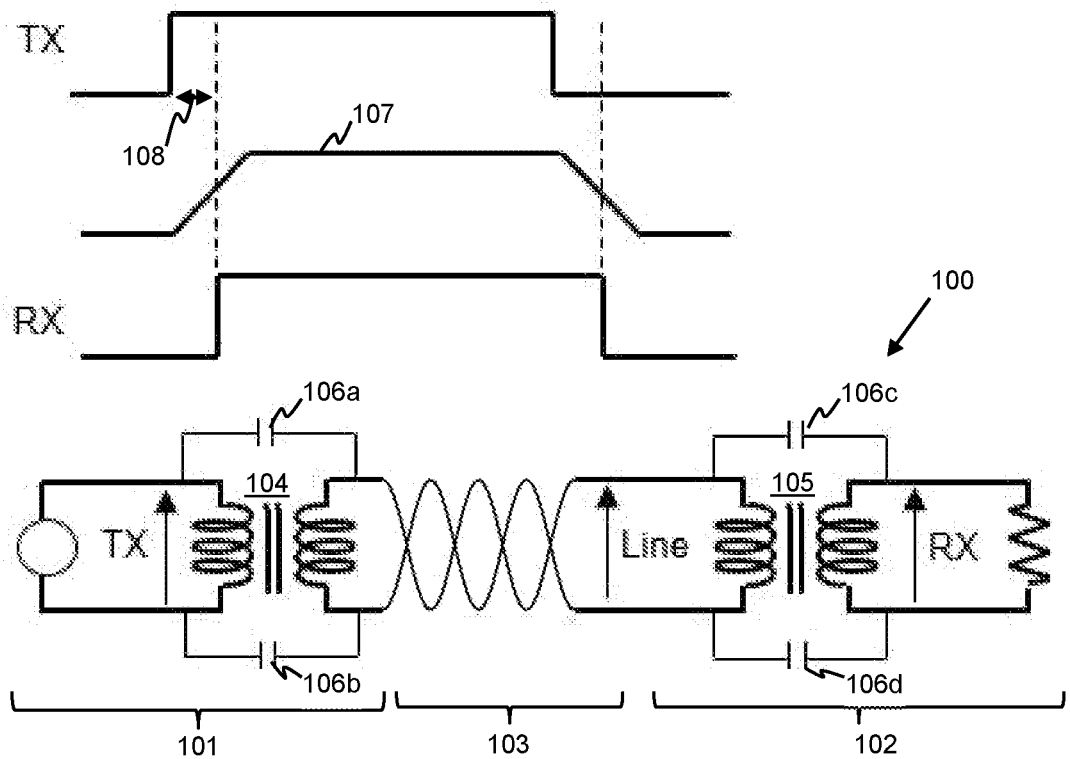
FIG. 1 is a schematic diagram of an example existing wired communications system.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 2:
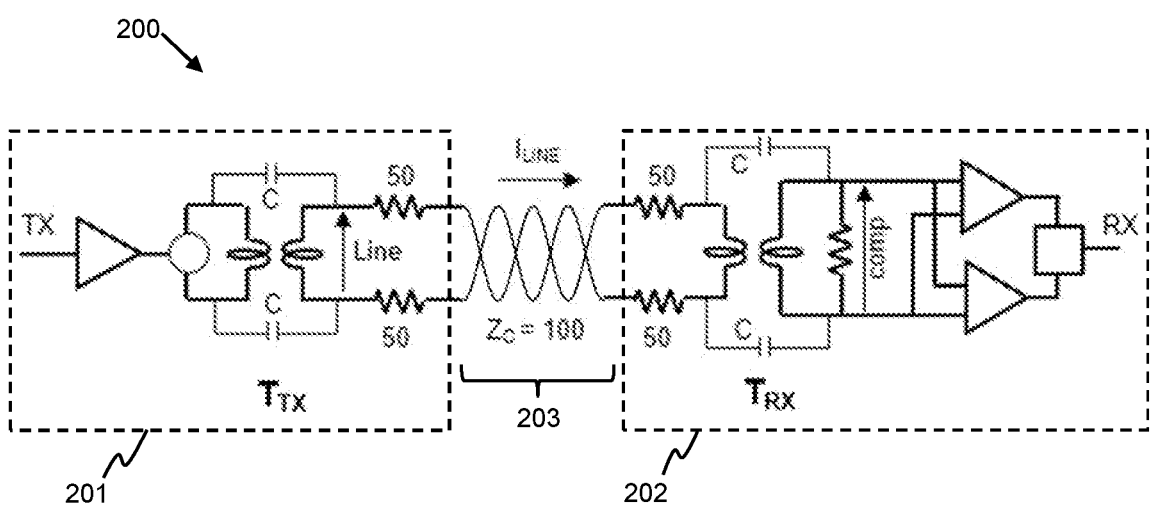
FIG. 2 is a schematic diagram of an example wired communications system according to the present disclosure.

FIG. 2 illustrates an example wired communications system 200 comprising a transmitter 201 and a receiver 202 connected via a transmission line 203. The transmission line 203 is a twisted pair of wires and has a characteristic impedance Zc at a frequency of operation, which in this example is 100Ω. The frequency of operation may for example be in the region of 100 MHz. A current $I_{LINE}$ passes along the transmission line 203, generated by the transmitter 201 and received at the receiver 202.

Figure 3:
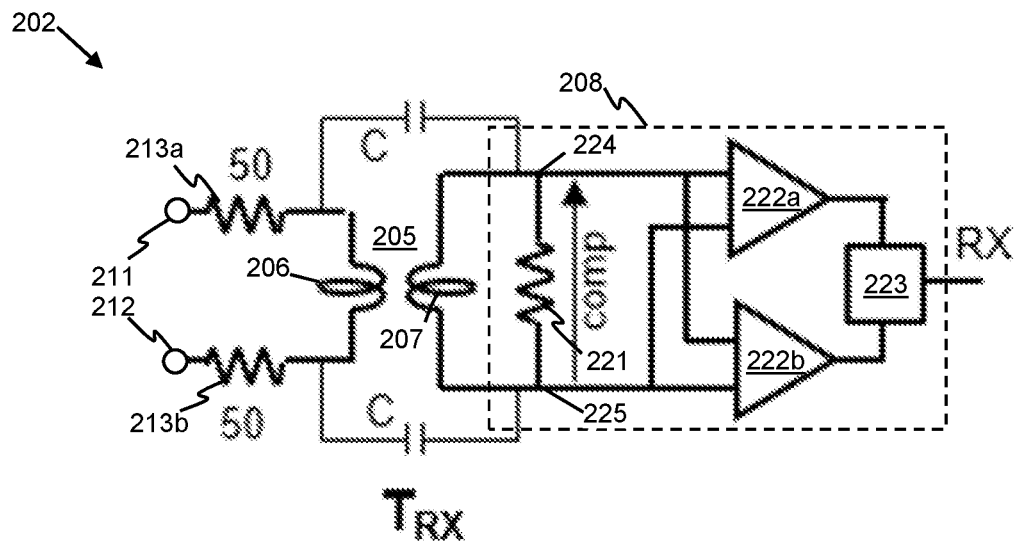
FIG. 3 is a schematic diagram of the receiver of the communications system of FIG. 2.

The receiver 202, which is shown in more detail in FIG. 3, has a pair of input connections 211, 212 connected to the transmission line 203. A termination resistance 213, which in the illustrated example is divided between first and second termination resistances 213a, 213b, is connected in series with the input connections 211, 212. The termination resistance 213 has a total resistance equal to the characteristic impedance Zc of the transmission line at its frequency of operation. In the illustrated example the termination resistance comprises first and second resistances 213a, 213b each of 50Ω, together matching the 100Ω transmission line impedance Zc. In other examples a single resistance connected to one of the input terminals 211, 212 may be provided with a resistance equal to Zc or different resistances may be provided that together make up a total equal to Zc, the effect of which is the same.

The receiver 202 has an air core transformer 205 with an input coil 206 connected to the input connections 211, 212 via the termination resistance 213 and an output coil 207. The term air core transformer as used herein may encompass a transformer have a core with a relative permeability of around 1, i.e. similar to that of air. Materials other than air may therefore form the core, such as FR epoxy commonly used for PCB insulating layers. Unlike conventional transformers, the termination resistance 213 is connected in series rather than in parallel with the input coil 206 because the coil 206 is in effect configured to measure current rather than voltage due to its low impedance. The output coil 207 is connected to a comparator circuit 208 that is configured to provide an output signal RX dependent on changes in the differential signal received at the input connections 211, 212.

The transformer 205 has parasitic capacitances C between the input and output coils 206, 207. The comparator circuit 208 in the illustrated example is configured to provide the output signal RX responsive to detection of voltage pulses across the output coil 208 of the transformer 205. The comparator circuit 208 in FIG. 3 comprises a resistance 221 connected across the output coil 207 and first and second comparators 222a, 222b having inputs connected across the resistance 221. A voltage pulse (comp) is generated across the resistor 221 when a pulse is received by the receiver 202. The comparators 222a, 222b may be arranged to provide opposing output signals, i.e. when comparator 222a provides a high output signal comparator 222b provides a low output signal and vice versa. A pair of comparators are connected across the output coil 207 to ensure that the impedance seen by the output coil 207 is the same regardless of the sign of pulse. Only one of the comparators 222a, 222b may, however be required to generate an output signal. A signal from one or both of the comparators 222a, 222b drives an output latch module 223 that generates the output signal RX.

Figure 4:
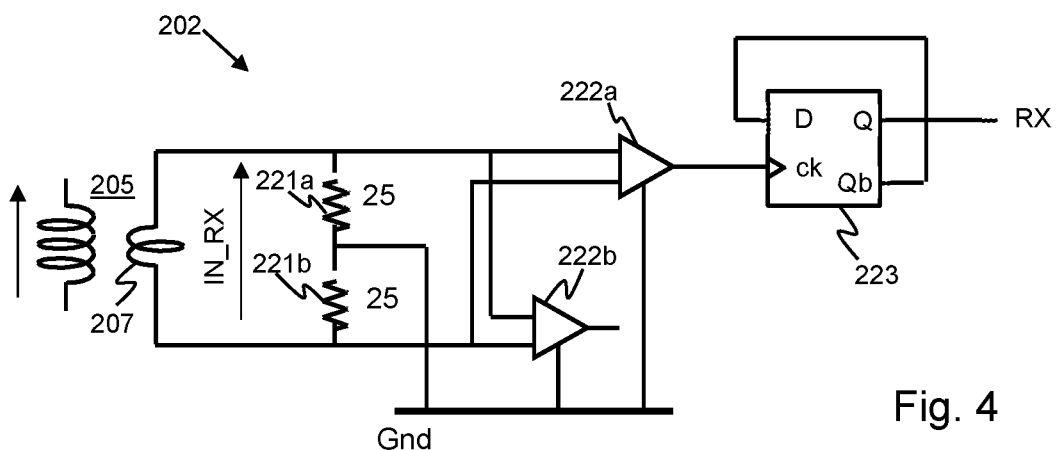
FIG. 4 is an alternative schematic diagram of the receiver of the communications system of FIG. 2.

FIG. 4 illustrates an alternative diagram of the receiver 202, showing one of the comparators 222a having its output connected to a latch module 223, which in this case is a gated D latch having its $\overline{Q}$ output connected to its D input so that a signal provided at its clock input ck generates a change in state of the Q output. The comparator circuit is thereby configured to provide an output signal RX that changes state upon receiving a pulse across the output coil 207. The resistor 221 in FIG. 3 is shown in FIG. 4 divided into first and second resistors 221a, 221b connected in series across the output coil 207, with a ground connection connected to a mid-point between the resistors 221a, 221b. Each comparator 222a, 222b is also connected to the ground connection, resulting in the comparator circuit transforming the differential signal input across the output coil 207 to a single-ended output signal RX.

Figure 5:
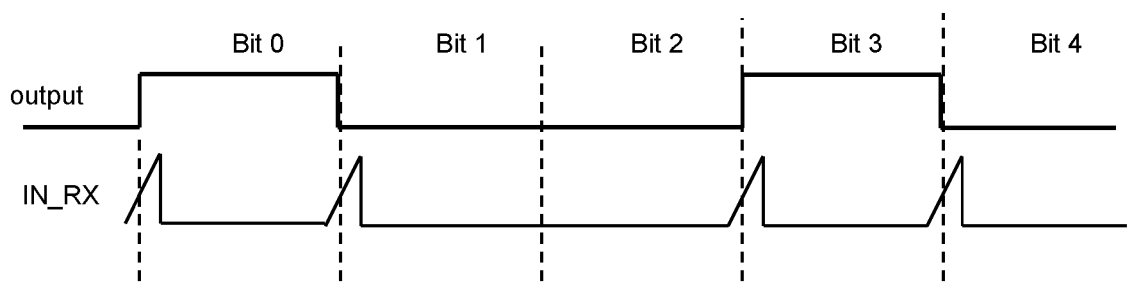
FIG. 5 is a diagram of a series of voltage transitions at the output of the receiver of FIG. 4 generated by a series of voltage pulses.

FIG. 5 illustrates schematically operation of the receiver 202 of FIG. 4, showing a series of input pulses on an input signal IN_RX and a corresponding output signal in the form of a sequence of bits. Each pulse causes the output to switch between first and second voltage levels, thereby forming the output bit sequence. In a general aspect therefore, the comparator circuit 208 of the receiver 202 may be configured to switch the output signal between a first voltage level and a second voltage level upon reception of a voltage pulse across the output coil 207 of the transformer 205.

Figure 6:
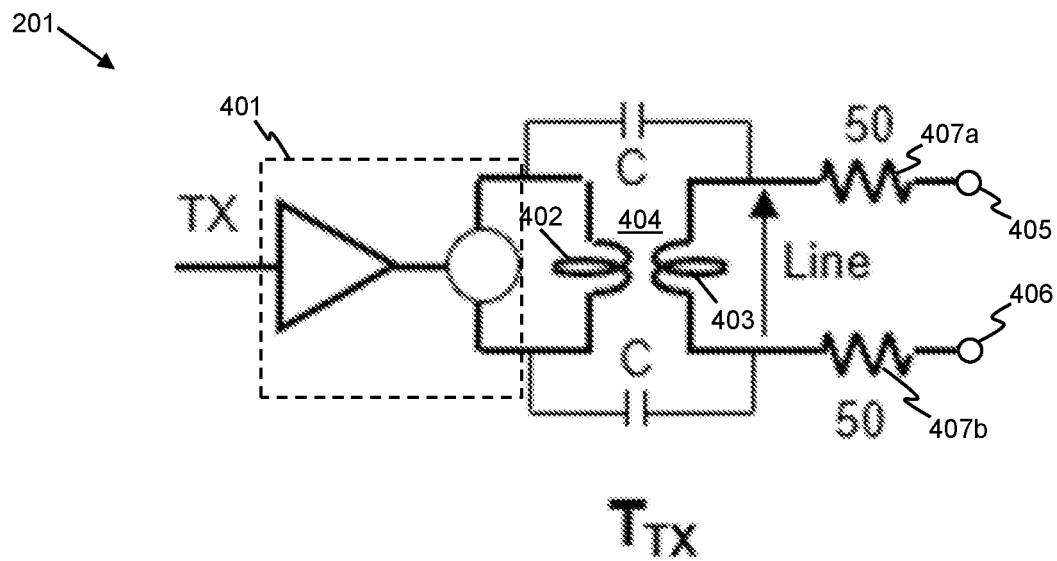
FIG. 6 is a schematic diagram of the transmitter of the communications system of FIG. 2.

FIG. 6 illustrates the example transmitter 201 of the communications system 200 in more detail. The transmitter 201 comprises a transmitter driver 401, which provides an amplified differential version of a single-sided input signal TX to the input coil 402 of an air core transformer 404. An output coil 403 of the transformer 404 is connected to a pair of output terminals 405, 406 via a terminal resistance 407a, 407b. As with the terminal resistance of the receiver 202, the terminal resistance 407a, 407b may be divided between the pair of output terminals 405, 406. The terminal resistance 407a, 407b has a total equal to the characteristic impedance Zc of the transmission line 203 at the frequency of operation. The transformer 405 has parasitic capacitances C between the input and output coils 402, 403.

Figure 7:
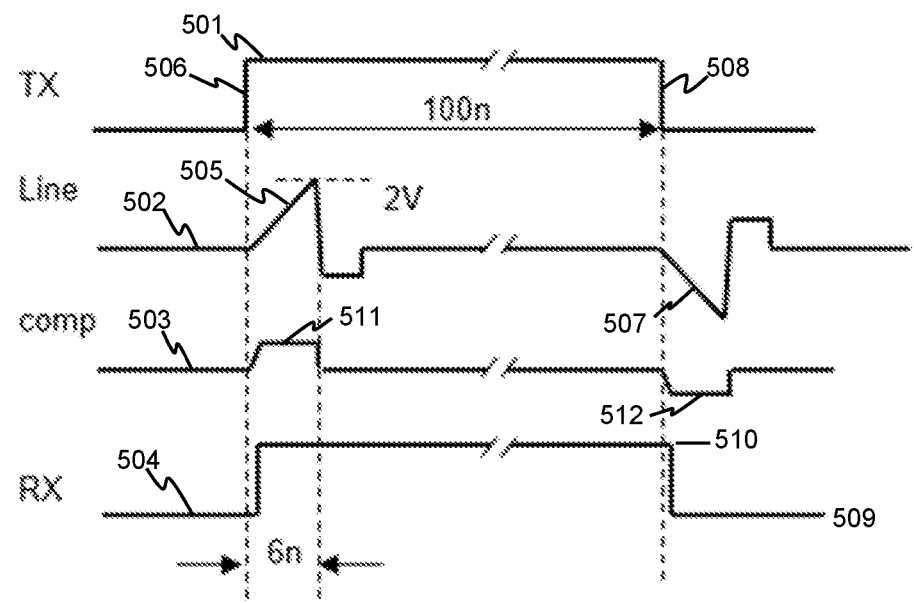
FIG. 7 is a series of signals relating to the communications system of FIG. 2.

FIG. 7 shows an example sequence of signals illustrating operation of the transmitter 201 and receiver 202 of the communications system 200. A transmission signal TX 501 is generated at the transmitter 201, which results in a transmission line signal (Line) 502. The line signal 502 is received at the receiver 202 and generates a received signal (comp) 503, which generates an output signal RX 504. In this example, the transmission signal 501 is a pulse of around 100 ns duration. Due to the low impedance and low parasitic capacitance characteristics of the air core transformer 404, the transmission pulse 501 results in a first positive pulse 505 after a rising edge 506 of the transmission pulse 501 and a second negative pulse 507 after a falling edge 508 of the transmission pulse 501. The first and second pulses 505, 507 have a shorter duration of around 6 ns, i.e. much shorter than the length of the transmission pulse 501. The first and second pulses 505, 507 result in corresponding respective positive and negative voltage pulses 511, 512 across the resistance 221 across the output coil 207 of the receiver transformer 207. These pulses 511, 512 each result in a transition of the output signal RX 504 from the receiver 202. The positive first pulse 511 results in a positive transition in the output signal 504, followed by the negative second pulse 512 resulting in a negative transition in the output signal 504. In a general aspect therefore, the comparator circuit 208 of the receiver 202 may be configured to switch the output signal RX 504 from a first voltage level 509 to a second voltage level 510 upon reception of a positive voltage pulse 505 across the output coil 207 of the transformer 205 and to switch the output signal RX 504 from the second voltage level 510 to the first voltage level 509 upon reception of a negative voltage pulse 507 across the output coil 207. As a result, the receiver output signal 504 replicates the transmitter input signal 501 with a delay corresponding to the transmission line length.

Figure 8:
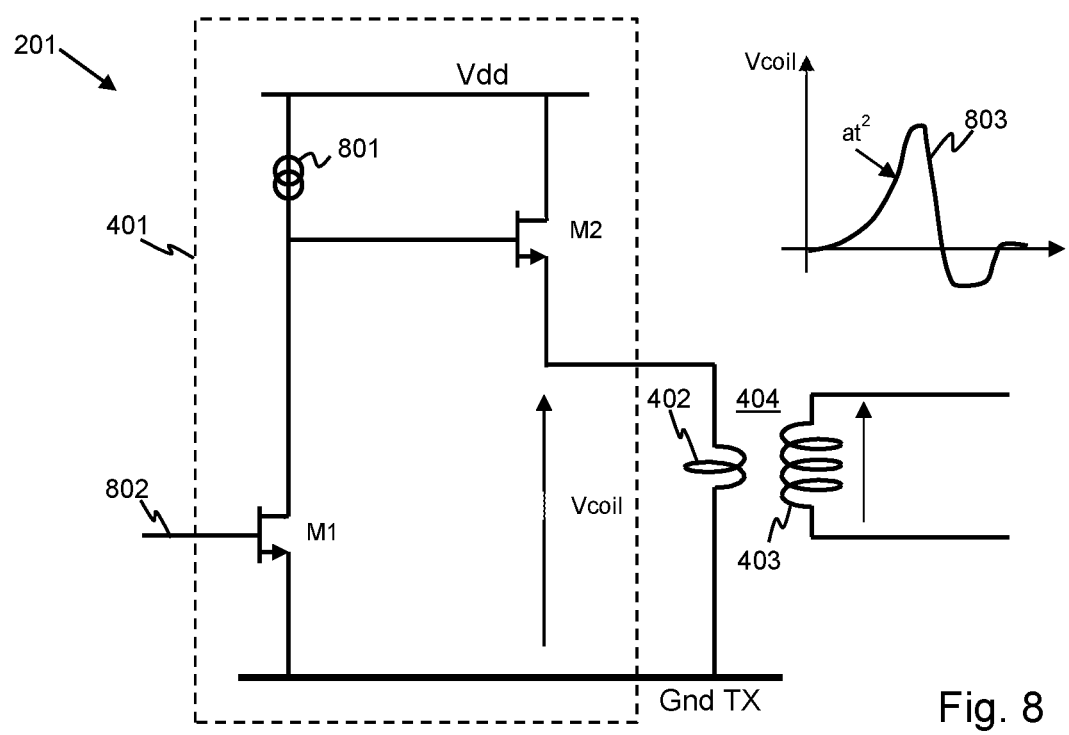
FIG. 8 is an alternative schematic diagram of the transmitter of FIG. 6.

FIG. 8 illustrates an example implementation of the transmitter 201, in which the transmitter driver circuit 401 comprises first and second transistors M1, M2, with the first transistor M1 in series with a current source 801 between a supply line Vdd and ground Gnd and the second transistor M2 connected as a follower stage driven by the first transistor M1. A current through the input coil 402 of the transformer 404 is driven by the second transistor M2. The voltage across the input coil 402, the inductance of which is low, is of the form shown in FIG. 8, where the shape of the voltage ramp in response to a step change at the input to the transmitter driver 401 is of the form at$^2$, where a is proportional to the step change in the input and t is time, i.e. the shape of the voltage ramp is quadratic. The voltage signal across the coil Vcoil peaks and then drops below zero as the inductor discharges and returns to zero. The driving circuit 401 is thereby configured to drive a current through the input coil 402 to generate a voltage pulse 803 across the input coil 402 in response to a change of state of an input signal provided to an input 802 of the driver circuit 401.

In a specific example, the transmission line 203 is a twisted pair cable having a length of up to around 20 m. This results in the transmission line acting as a low pass filter above around 50 MHz with a time constant of 3.2 ns. A suitable pulse duration for the transmission signal may therefore be around 6 ns. If the maximum coil current for a 30 nH coil is set to be 130 mA, the maximum magnetic flux will be nearly 4 nWb. To stay within this maximum magnetic flux, a 2V pulse on the transmission line may be generated by different forms of input signal, for example a square pulse, a linear ramp or a quadratic shaped ramp. A square pulse will generate a 2 ns pulse, a linear ramp a 4 ns pulse and a quadratic ramp a 6 ns pulse for the same magnetic flux. The input signal TX 506 provided to the transmitter driver 401 may therefore be of differing forms to that shown in FIGS. 7 and 8, with the leading and trailing edges 506, 508 in the form of rising and falling ramps, which may be linear or quadratic in form. An input pulse having a rising ramp of a quadratic form is generally preferred because this transforms to a linear voltage rise in current through the transmission line.

Because each transformer is connected to the transmission line via a terminal resistance which is equal to the characteristic impedance of the transmission line, the transmitter and receiver are both adapted closely to the transmission line.

For simplification each of the transformers 205, 404 may be considered to have a transformer ratio of 1:1, with the input and output coils both having only one turn. Increasing the number of turns of the transformer side connected to the twisted pair transmission line, i.e. the input coil 206 of the receiver transformer 205 and the output coil 403 of the transmitter transformer 404, increases the receiver level. In an ideal case, the receiver level is proportional to $n^2$, resulting in for example 100 mV for n=1 and 400 mV for n=2. By symmetry, the n turns of each transformer is always connected with the transmission line via the terminal resistance. The receiver transformer 205 therefore multiplies the input signal by n, while the transmitter transformer 404 by symmetry will multiply the signal by ½. The receiver amplitude should therefore be the same. This does not, however, apply in this case because the amplitude of ViR at the receiver is a function of the inductance value. If the input coil has n turns, the inductance will be multiplied by $n^2$. The maximum receiver signal amplitude is therefore roughly proportional instead to $n^2$. As a result, changing the value of n for the transformers 205, 404 can help to increase the receiver level for the same input current. In practice, due to the way the air core transformer may be implemented by layering conductors in a PCB, the number chosen for n may be a small integer, for example between 1 and 5.

An air core transformer may provide up to around a 50% leakage inductance, meaning that the secondary coil will 'see' only around 50% of the input signal for a 1:1 coil ratio. A higher value of n therefore assists in compensating to some extent for this lack of signal. With n=2 the line voltage is partly compensated for a 50% leakage transformer, while with n=3 the line voltage is over-compensated. In some examples therefore the value for n may be between around 2 and 3.

Because the transmitter output and receiver input both have a low impedance, the transmission line may be considered to be practically shorted at both ends due to the low inductance of the air core transformers. This has an advantage of reducing the magnitude of line reflections. In an example where the characteristic impedance is 100Ω and a line delay is 100 ns (corresponding to a line length of around 20 m), simulations show that a received signal reflected back and forth from the transmitter side is reduced by around 20 times compared to the initial received signal. In a general aspect, the impedance of the output coil of the transmitter air core transformer and the input coil of the receiver air core transformer, which will generally have the same number of turns, will have an impedance at a frequency of operation that is smaller than, and may for example be less than half that of, the terminal resistance and the impedance of the transmission line. In a specific example, given a frequency of operation of 100 MHz and a coil impedance of 30 nH, the impedance of the transmission line and the terminal resistance may be both 100Ω while the impedance of the coil will be around 19Ω.

In a specific example, each coil of the air core transformer of the transmitter and/or receiver may be formed as a conductive trace within a PCB. A coil having a diameter of 10 mm from a wire 0.45 mm wide results in an inductance of around 20 nH with a parasitic capacitance of 0.2 pF, while a wire 0.1 mm wide results in an inductance of 30 nH and a parasitic capacitance of around 0.06 pF.

A coil of such dimensions can therefore be provided in a PCB implementation of transmitter and receiver of small size, requiring few additional components, resulting in considerable savings in cost and complexity compared to existing systems.

Applications for the communications system disclosed herein may be for example in battery management systems, in which communication of voltage and charging levels is required between multiple battery units while ensuring galvanic isolation. The size and cost of the communication systems in such applications is of increased significance due to the restricted space and cost requirements involved. In one aspect therefore there may be provided a battery management system comprising first and second battery units and a communications system as disclosed herein providing communication between the first and second battery units.

From reading the present disclosure, other variations and modifications will be apparent to the skilled person. Such variations and modifications may involve equivalent and other features which are already known in the art of wired communications systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A communications transmitter comprising:
   a pair of output connections for connecting to a transmission line;
   a termination resistance equal to a characteristic impedance (Zc) of the transmission line;
   an air core transformer having an output coil connected to the pair of output connections via the termination resistance; and
   a driver circuit connected to an input coil of the air core transformer, the driver circuit configured to drive a current through the input coil to provide a voltage pulse across the input coil in response to a change of state of an input signal provided to an input of the driver circuit.

2. The communications transmitter of claim 1, wherein the driver circuit is configured to provide the voltage pulse having a quadratic shaped rising edge.

3. The communications transmitter of claim 1, wherein the air core transformer has a coil ratio of n:1, where n is the number of turns of the output coil.

4. The communications transmitter of claim 3, wherein n is between around 1 and around 5.

5. The communications transmitter of claim 3 wherein n is between around 2 and 3.

6. The communications transmitter of claim 3, wherein the air core transformer is formed from parallel wire loops within a PCB.

7. The communications transmitter of claim 3, wherein a parasitic capacitance of the air core transformer is less than 0.5 pF.

8. The communications transmitter of claim 3, wherein each turn of the input or output coil has an inductance of less than 50 nH.

9. The communications transmitter of claim 1, wherein the air core transformer is formed from parallel wire loops within a PCB.

10. The communications transmitter of claim 1, wherein a parasitic capacitance of the air core transformer is less than 0.5 pF.

11. The communications transmitter of claim 1, wherein each turn of the input or output coil has an inductance of less than 50 nH.

* * * * *